(12) United States Patent
Arnold et al.

(10) Patent No.: US 10,252,914 B2
(45) Date of Patent: Apr. 9, 2019

(54) NANOSTRUCTURED GRAPHENE WITH ATOMICALLY-SMOOTH EDGES

(71) Applicant: Wisconsin Alumni Research Foundation, Madison, WI (US)

(72) Inventors: Michael Scott Arnold, Middleton, WI (US); Padma Gopalan, Madison, WI (US); Nathaniel S. Safron, Madison, WI (US); Myungwoong Kim, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 320 days.

(21) Appl. No.: 15/184,036

(22) Filed: Jun. 16, 2016

(65) Prior Publication Data
US 2016/0368773 A1   Dec. 22, 2016

Related U.S. Application Data

(62) Division of application No. 13/282,666, filed on Oct. 27, 2011, now Pat. No. 9,394,177.

(51) Int. Cl.
*C01B 32/182* (2017.01)
*B82Y 30/00* (2011.01)
*B82Y 40/00* (2011.01)
*C01B 32/186* (2017.01)
*C01B 32/194* (2017.01)

(52) U.S. Cl.
CPC ............ *C01B 32/182* (2017.08); *B82Y 30/00* (2013.01); *B82Y 40/00* (2013.01); *C01B 32/186* (2017.08); *C01B 32/194* (2017.08); *C01B 2204/32* (2013.01); *Y10S 977/734* (2013.01); *Y10S 977/843* (2013.01); *Y10S 977/932* (2013.01); *Y10T 428/24802* (2015.01)

(58) Field of Classification Search
CPC ... C01B 32/194; C01B 32/182; C01B 32/186; Y10T 428/24802
See application file for complete search history.

(56) References Cited

U.S. PATENT DOCUMENTS

2011/0253969 A1* 10/2011 Dai .................. B82Y 30/00
                                                                257/9
2012/0261644 A1* 10/2012 Dimitrakopoulos ... B82Y 30/00
                                                                257/29

FOREIGN PATENT DOCUMENTS

WO    WO-2011094597 A2 *  8/2011  ............. B82Y 30/00

OTHER PUBLICATIONS

Jia et al., "Controlled Formation of Sharp Zigzag and Armchair Edges in Graphitic Nanoribbons", Science, 2009, vol. 323, p. 1701-1705 (Year: 2009).*

(Continued)

Primary Examiner — Gerard Higgins
(74) Attorney, Agent, or Firm — Bell & Manning, LLC

(57) ABSTRACT

Methods of producing layers of patterned graphene with smooth edges are provided. The methods comprise the steps of fabricating a layer of crystalline graphene on a surface, wherein the layer of crystalline graphene has a crystallographically disordered edge, and decreasing the crystallographic disorder of the edge of the layer of crystalline graphene by heating the layer of crystalline graphene on the surface at an elevated temperature in a catalytic environment comprising carbon-containing molecules.

13 Claims, 2 Drawing Sheets

(56) References Cited

OTHER PUBLICATIONS

Lim et al., Dopant-specific unzipping of carbon nanotubes for intact crystalline graphene nanostructures, Nature Communications, Jan. 22, 2015, pp. 1-9.
Jiao et al., Aligned Graphene Nanoribbons and Crossbars from Unzipped Carbon Nanotubes, Nano Res, 2010, pp. 387-394.

* cited by examiner

NANOSTRUCTURED GRAPHENE WITH ATOMICALLY-SMOOTH EDGES

CROSS-REFERENCE TO RELATED APPLICATIONS

The present application is a divisional of U.S. patent application Ser. No. 13/282,666 that was filed Oct. 27, 2011, the entire contents of which are hereby incorporated by reference.

REFERENCE TO GOVERNMENT RIGHTS

The invention was made with government support under DMR-0832760 awarded by the National Science Foundation. The government has certain rights in the invention.

BACKGROUND

Graphene is a two-dimensional hexagonal network of $sp^2$ hybridized carbon atoms. Graphene has been the subject of intense research recently because of its outstanding electrical properties and because of several intriguing phenomena that have been observed in the two-dimensional carbon-based material. For many applications, a suitable method for creating spatially defined patterns of appropriate size (ranging from millimeter to nanometer scales) and shape in graphene is necessary or desirable. For example, graphene can be transformed into a semiconductor over large-areas by patterning it on the nanometer scale into nanoribbons, quantum dots or continuous nanoperforated sheets ("antidot lattices"). Typically, this is accomplished by growing or isolating a full graphene sheet and then etching away the unwanted regions of the graphene from the top-down using lithography in conjunction with reactive ion etching or through ion bombardment.

Unfortunately, top-down patterning creates graphene with atomically-disordered edges, in the form of dangling bonds, defects, chemical functionalization, and roughness. This edge disorder can degrade graphene's electronic, optical, thermal and structural properties, including its electron mobility and strength.

It has been reported that defective and disordered edges of graphene will undergo reorganization at 1500-2000° C. via Joule heating. (Jia et al., Science 2009, 323, 5922, 1701-1705.) However, the high temperatures used during this process are too extreme for many electronics applications.

SUMMARY

Methods for fabricating graphene structures having smooth edges are provided. In some embodiments, the methods provide graphene structures with features that are aligned with the crystallographic direction or symmetry of the graphene in which they are defined. In one embodiment, the method comprises fabricating a layer of crystalline graphene on a surface, wherein the layer of crystalline graphene has one or more crystallographically disordered edges; and subsequently decreasing the crystallographic disorder of the one or more crystallographically disordered edges by heating the layer of crystalline graphene on the surface at an elevated temperature in a catalytic environment comprising carbon-containing molecules.

The methods can be used to smooth the disordered edges in a layer of graphene that result from top-down or bottom-up patterning of the layer of graphene. For example, the methods can be used to smooth the internal edges of holes in a graphene antidot lattice or to smooth the edges of graphene nanoribbons in a graphene nanoribbon array.

In the methods, the step of heating the layer of crystalline graphene can be carried out at temperatures of about 1000° C. or lower. For example, the heating step can be carried out at temperatures in the range from about 700° C. to about 900° C. Examples of carbon-containing molecules that can be used during the heating step include aliphatic hydrocarbons, aromatic hydrocarbons and derivatives thereof.

Patterned graphene made in accordance with the present methods is also provided. The patterned graphene comprises a layer of graphene having a plurality of features defined therein, wherein the features have internal or external edges that are aligned with the crystallographic direction of the graphene lattice. The arrays can contain large numbers of the features arranged in a regular or irregular pattern. For example, the arrays can include at least 1,000, at least 10,000, at least 100,000, or even at least 1,000,000 features in the layer of graphene. In some embodiments, the graphene has a high density of features. For example, in some embodiments the features have a density of at least $1 \times 10^5$ features/cm$^2$ over an area of at least 1 µm$^2$. This includes embodiments in which the features have a density of at least $1 \times 10^6$, at least $1 \times 10^7$, at least $1 \times 10^8$, at least $1 \times 10^9$ and at least $1 \times 10^{10}$ features/cm$^2$ over an area of at least 1 µm$^2$.

An example of a graphene structure that can be fabricated using the methods is a graphene antidot lattice comprising a layer of graphene in which the features are holes arranged in a periodic array. Within the antidot lattice the holes are hexagonal in shape and aligned with the hexagonal crystal structure of the graphene lattice. Such graphene antidot lattices can be fabricated over large areas with high hole densities. For example, the present methods can be used to make graphene antidot lattices with a hole density of at least $1 \times 10^{11}$ holes/cm$^2$ over an area of at least 1 µm$^2$.

Another example of a graphene structure that can be fabricated using the methods is a graphene nanoribbon array in which the features are graphene nanoribbons aligned in a parallel arrangement along their longitudinal axes, wherein the edges of the nanoribbons have an rms roughness of 5 nm or less and are aligned with the crystallographic direction of the graphene lattice. Such graphene nanoribbon arrays can fabricated with a large number of nanoribbons. For example, in some embodiments, the graphene nanoribbon array can comprise at least 1,000 nanoribbons.

Other principal features and advantages of the methods and structures will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

DETAILED DESCRIPTION

Methods for forming layers of graphene with smooth and straight edges are provided. Also provided are patterned graphene structures made with the methods. The methods utilize a low-temperature edge annealing process to catalyze the repair of random intrinsic defects along the edges of a layer of graphene on a catalytic surface and to increase the crystallographic alignment of features patterned into the graphene with the crystallographic direction and symmetry of the graphene lattice. The methods can be used to fabricate graphene nanoribbons with smooth, straight edges that are aligned with the crystallographic direction of the graphene lattice or to fabricate graphene antidot arrays with hexagonal holes that are aligned with the hexagonal crystal structure of the graphene lattice.

Figure 1:
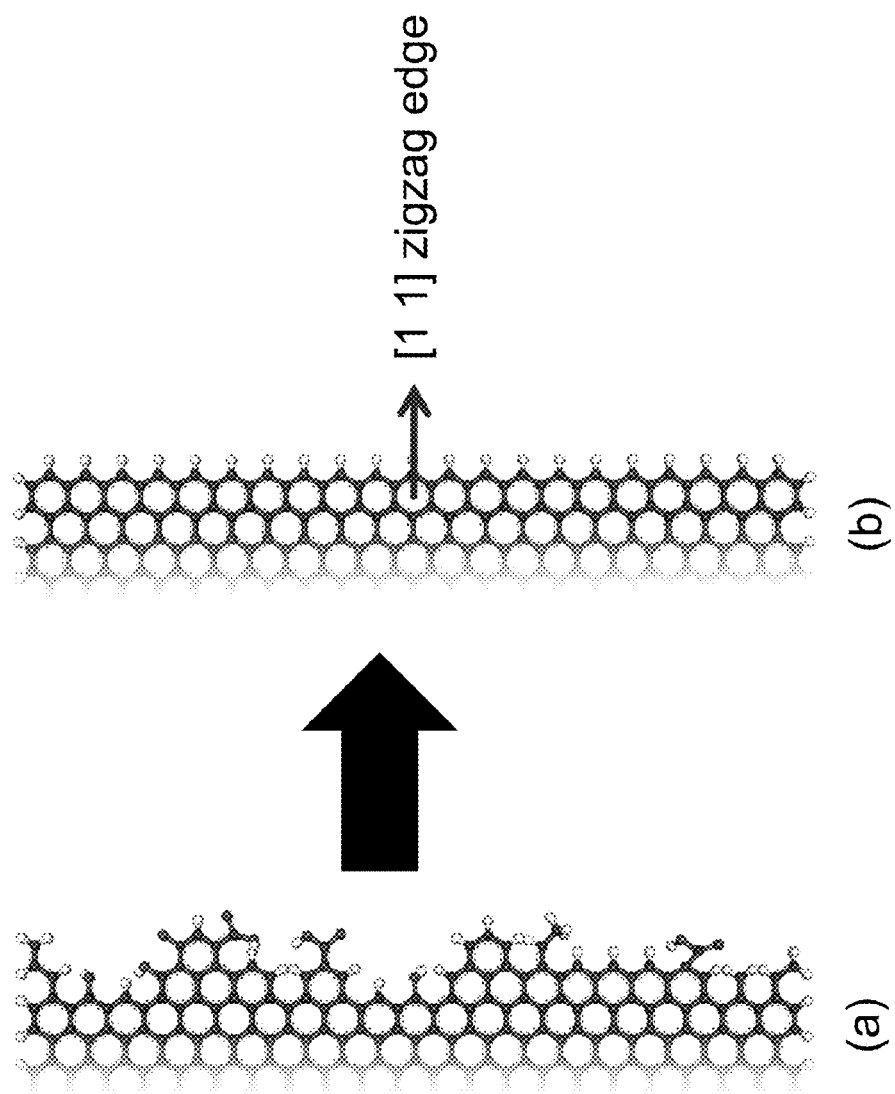
FIG. 1 provides a schematic illustration of the conversion of an atomically-disordered graphene edge having randomly spaced protrusions of carbon atoms (panel (a)) to an atomically-smooth graphene edge having a perfect [1 1] zigzag configuration (panel (b)).

The methods can provide edges in the graphene that are ordered on the sub-nanometer scale. This can be accomplished by reconstruction of randomly spaced, oriented and/or shaped kinks, protrusions and indentations along graphene edges which cause the edge structure to deviate from a perfect crystallographic direction (e.g., zigzag or armchair). FIG. 1 provides a schematic illustration of the conversion of an atomically disordered graphene edge having randomly spaced, oriented and shaped protrusions of carbon atoms (panel (a)) to an atomically-smooth graphene edge having a perfect [1 1] zigzag configuration (panel (b)). As shown in the figure, the carbon atoms at the edge (dark spheres) may be terminated with hydrogen atoms (white spheres).

In addition, the methods can decrease disorder by providing edges that are straight on the sub-nanometer scale over considerable distances. This can be accomplished by reconstructing the edges such that they are better aligned with the crystallographic direction (e.g., zigzag or armchair) of the graphene lattice, thereby eliminating the (typically regularly spaced) bends or kinks that are characteristic of a lattice misalignment.

The methods can also be used to decrease the crystallographic disorder in a layer or layers of graphene that define a pattern of features, such as a continuous layer of graphene into which an array of holes has been patterned or a discontinuous layer of graphene into which an array of graphene dots or ribbons has been patterned. The crystallographic disorder in such system can be reduced by reconstructing the irregularly shaped edges of the features such that they are smoother and better aligned with the hexagonal crystal symmetry of the graphene lattice.

The degree of edge smoothness can be characterized by the rms roughness of the edge. Some embodiments of the methods produce edges with an rms roughness of less than 5 nanometers. This includes embodiments in which the edges have an rms roughness of less than 3 nanometers and further includes embodiments in which the edges have an rms roughness of less than 1 nanometer. The degree of edge straightness can be characterized by the length over which the edge remains aligned with the crystallographic lattice of the graphene, which is a function of the angle of misalignment between the edge feature and the graphene lattice. The lengths over which graphene edges can be rendered smooth and aligned are considerable. For example, in some embodiments, the present methods provide edges having a rms roughness of 5 nm or better and/or crystallographic lattice alignment over lengths of at least 50 nm, at least 100 nm, at least 1 μm, at least 100 μm or at least 1 mm.

The methods are based, at least in part, on the recognition that the crystallographic edge structures of graphene are controlled by thermodynamics, which seeks to reduce free energy and form ordered edges along the crystalline directions in graphene, yet kinetic barriers to reorganization normally prevent the edge carbon atoms from reorganizing to achieve a lower energy state. In order to solve this problem, the present methods use a substrate surface, to which the graphene is bonded, that acts as a catalyst for the reorganization of edge carbon atoms. As a result of the edge reorganization, the internal and/or external edges of a nanostructured layer of graphene become smoother and more aligned with the crystallographic lattice of the graphene. As a result of the methods, the area of the layer of graphene can become smaller or larger, depending on the nature of the reorganization.

One basic embodiment of the methods comprises the steps of fabricating a layer of crystalline graphene on a catalytic surface, wherein the layer of crystalline graphene has at least one crystallographically disordered edge, and subsequently decreasing the crystallographic disorder of the edge of the layer of crystalline graphene by heating the layer of crystalline graphene on the catalytic surface at an elevated temperature in a catalytic environment comprising carbon-containing molecules, wherein the decrease in crystallographic disorder is catalyzed by the catalytic surface.

As used herein, the phrase "a catalytic environment comprising carbon-containing molecules" refers to an environment in which the carbon-containing molecules are not only present, but also participate, in some form, in the process of decreasing the crystallographic disorder. The carbon-containing molecules can be in the form of vapor phase molecules or can be in solid form as, for example, a carbon-containing material (e.g., amorphous carbon or a carbon-containing polymer) deposited on the surface. Without intending to be bound to any particular theory of the catalytic mechanism, the inventors believe it is possible that the catalytic surface may act as an intermediate stage for the dynamic detachment and subsequent re-attachment of carbon atoms and clusters to and from the edges of the nanostructured graphene. In this mechanism, the carbon-containing molecules may suppress the sublimation of carbon atoms from the catalytic substrate after they have broken away from unstable bonding sites along the edge of the graphene, but before they have diffused on the catalytic surface to stable bonding sites and re-bonded to the edge. Alternatively, the surface may be catalyzing the etching of disordered portions of the graphene edges by hydrogen present in the fabrication chamber and the carbon-containing molecules may be reconstructing the etched portions to form a smoother, more aligned edge structure.

The initial crystallographic disorder in one or more edges of the layer of graphene can be the result of imperfect bottom-up growth, as in the case of chemical vapor deposition (CVD) grown graphene, or imperfect top-down patterning, as in the case of lithographically patterned graphene. Examples of lithographic techniques that can be used to form a patterned layer of graphene (and which would be expected to create crystallographically disordered edges) include, but are not limited to, block copolymer lithography, nanosphere lithography, e-beam lithography, interference lithography and photolithography. Methods for patterning graphene layers using block copolymer lithography are described in U.S. patent application publication number US 2011/0201201.

An advantage of the use of a catalytic surface is that edge reorganization can be carried out at elevated temperatures (i.e., temperatures above ambient) that are substantially lower than those that would be needed to carry out edge reorganization in the absence of the catalytic surface. In addition, by allowing the edge reorganization to proceed in the presence of an appropriate carbon-containing environment, the edge reorganization can be conducted under conditions that promote neither net shrinkage of the graphene via carbon sublimation nor continued disordered growth of the graphene via vapor deposition.

The elevated temperature at which the graphene is annealed should be high enough to induce edge reorganization on the catalytic substrate, but is desirably still low enough to be compatible with the low temperature processing conditions that are commonly used in electronic device fabrication. Thus, in some embodiments, the edge reorganization is carried out at a temperature of no greater than about 1200° C. This includes embodiments in which the edge reorganization is carried out at a temperature of no greater than about 1000° C. and further includes embodiments in which the edge reorganization is carried out at a temperature of no greater than about 900° C. For example, in various embodiments, the edge reorganization can be carried out at temperatures in the range from about 700° C. to about 1000° C., including embodiments in which the edge reorganization is carried out at temperatures in the range from about 800° C. to about 900° C. Temperatures in these ranges are substantially lower than those that would be required to induce edge reorganization in the absence of the catalytic surface. For example, in some embodiments annealing is carried out at a temperature that is no greater than half the temperature that would be required to induce edge reorganization in the absence of the catalytic surface.

The carbon-containing molecules can be, for example, the types of carbon-containing molecules that are used as carbon precursors in the CVD growth of graphene. Such molecules include aliphatic and aromatic hydrocarbons, such as methane, acetylene, ethylene, benzene and derivatives thereof. These carbon-containing molecules can be mixed with other, inert carrier gases, such as hydrogen and/or argon. The amount of carbon-containing molecules present during the annealing process should be sufficient either to suppress carbon sublimation or to replace at least some of the carbon loss to sublimation during the edge reorganization. The optimal amount will be depend upon variables such as temperature, flow rates, catalyst materials, and type of carbon-containing molecules used.

The catalytic surface upon which edge reorganization occurs can be any surface upon which graphene can be grown that catalyzes the edge reorganization. Such surfaces include metal and ceramic surfaces, such as copper, nickel, ruthenium and silicon carbide surfaces.

A broad range of graphene structures can be made using the present methods. These include structures wherein a layer or layers of graphene have been patterned into an array of discontinuous features (e.g., arrays of nanoribbons or nanodots) and further includes continuous graphene layers into which arrays of features (e.g., holes) have been patterned. The features in the arrays can be spaced with a regular periodicity or can be randomly spaced in the graphene. In addition, the arrays may themselves be formed from an arrangement of sub-arrays, as in the case where a sub-array of nanoribbons is integrated into a field effect transistor and a plurality of such sub-arrays are arranged on a wafer to form an integrated circuit comprising many FETs over a large area. The features in these arrays typically have at least one dimension (and frequently two or all three dimensions) of 1000 nm or less. The sizes and spacing of the features can be chosen to provide the graphene structures with electronic and/or magnetic properties that are not present in the unpatterned graphene.

The present methods can produce patterned graphene comprising a layer of graphene having a large number of smooth-edged features patterned therein. In some embodiments, the patterned graphene includes such features at high densities over a large area. Because the present methods do not substantially increase the size of lithographically patterned features, and may actually decrease their size, the methods can create smooth-edged features with dimension at least as small as the disordered-edged features initially created by top-down or bottom-up patterning techniques. In addition, because the present methods are based on the repair of patterned graphene structures that can be made with high throughput techniques, the methods can combine the ability to create features having edges with sub-nanometer rms roughness with the ability to fabricate a large number of features on a commercially feasible timescale. Moreover, these features can be fabricated at high densities over commercially practical areas (e.g., $\geq 1$ μm$^2$, $\geq 1$ mm$^2$, $\geq 1$ cm$^2$, or greater).

The features can be any structures that are defined by (e.g., patterned into) the graphene layer that are not inherently present as part of the crystal structure of graphene. That is, the hexagonal shapes that make up the 2D hexagonal crystal structure of graphene are not features, as that term is used herein. Examples of features include holes (of various shapes and sizes), strips (of various aspect ratios) and dots.

One example of a graphene structure that can be made with the present methods is a graphene antidot lattice. A graphene antidot lattice comprises a layer or layers of graphene into which a periodic array of holes has been patterned. The array of holes opens a bandgap in the electronic structure of the graphene, which can provide it with useful electronic and/or magnetic properties. The present methods are able to produce antidot lattices wherein the holes are hexagonally-shaped and aligned with the hexagonal crystal symmetry of the graphene. The use of the present methods to fabricate a graphene antidot lattice is illustrated in the Example, below.

The present methods can be used to fabricate antidot lattices having hexagonal holes with diameters of 50 nm or less, 40 nm or less, 30 nm or less, 20 nm or less, or 10 nm or less. Arrays of these holes can be formed at densities of, for example, at least $1 \times 10^{11}$ (e.g., at least $1 \times 10^{12}$ or at least $5 \times 10^{12}$) holes/cm$^2$ over areas of at least 1 μm$^2$. This includes high density antidot lattices that extend over areas of at least 100 μm$^2$, at least 1 mm$^2$, and at least 10 mm$^2$.

Another example of a graphene structure that can be made with the present methods is a graphene nanoribbon array. Graphene nanoribbons are narrow strips (or "ribbons") of graphene having widths and crystallographic edge structures that provide the ribbons with electronic properties, such as electronic bandgaps, that are absent in larger area layers of the graphene. Graphene nanoribbon arrays comprise a periodic arrangement of a plurality of nanoribbons aligned along their longitudinal axes. The present methods are able to produce graphene nanoribbon arrays, wherein the longitudinal edges of the graphene nanoribbons are smooth and aligned with the crystalline direction of the graphene lattice.

The present methods can produce graphene nanoribbon arrays having a high density of very narrow, smooth-edged, nanoribbons over a large area. The width of the nanoribbons in the array is typically no greater than about 10 nm and desirably no greater than about 5 nm. The lengths of the nanoribbons are typically considerably greater than their widths. By way of illustration only, the nanoribbons can have aspect ratios of 10:1, 50:1, 100:1, 1000:1, or greater. However, arrays of nanoribbons having widths and lengths outside of these ranges can also be fabricated. The spacing between the nanoribbons in the array (i.e., their 'pitch') can be quite small in order to provide high density arrays. For example, in some embodiments the graphene nanoribbon arrays will have a pitch of 500 nm or less. This includes embodiments in which the pitch of the nanoribbons in the array is 100 nm or less, further includes embodiments in which the pitch is 50 nm or less and still further includes embodiments in which the pitch is 10 nm or less. Arrays of these atomically-smooth nanoribbons can include thousands of nanoribbons and can be formed over areas of, for example, at least 1 $\mu m^2$. This includes high density nanoribbon arrays that extend over areas of at least 100 $\mu m^2$, at least 1 $mm^2$, and at least 10 $mm^2$.

EXAMPLE

This example illustrates a method of producing atomically-smooth hexagonal holes in a layer of graphene.

Materials and Methods

CVD Graphene Growth:

Large-area monolayer graphene was grown in a horizontal CVD furnace with a 32 mm ID quartz tube. Copper foil (Alfa Aesar, product #13382) was used as the growth catalyst and the catalytic surface for edge reorganization. The foil was heated to 1050° C. under the flow of 340 sccm forming gas (95% argon, 5% hydrogen) and annealed under the same conditions for 30 minutes. The furnace was then cooled to 1020° C., where upon methane was introduced at 26 ppm and graphene was allowed to grow for 16 hours. The foil was then rapidly cooled at ~10° C./sec to 700° C. and then allowed to cool to room-temperature.

Top-Down Nanopatterning Via Block Copolymer (BCP) Lithography on Cu Foil:

To deposit a block copolymer film on the graphene/Cu foil, a floating and transferring technique was used in which a thin film of the diblock copolymer poly(styrene-block-methyl methacrylate) (P(S-b-MMA)) is used as the starting material to form the BCP etch mask. P(S-b-MMA) forms cylindrical domains in a hexagonal array. In order to ensure the lateral phase segregation of the diblock copolymer into vertically oriented cylinders on the graphene surfaces, two additional intermediate layers—a layer of silicon oxide and a layer of random copolymer of styrene and methyl methacrylate (P(S-r-MMA))—were used to provide a three-layered Si oxide/P(S-r-MMA)/(P(S-b-MMA) film. This film was initially formed on a separate "dummy" Si substrate and then transferred to the graphene/Cu foil.

The three-layered film was formed as follows. First, PE-CVD (Plasma Therm 74) was performed in order to deposit 150 nm of silicon oxide on a "dummy" silicon wafer. Then, a 1 wt % solution of hydroxyl terminated P(S-r-MMA) random copolymer (S: 70%, MMA: 30%) in toluene was spin-coated at 1,000 rpm, and annealed at 220° C. for 6 hrs under vacuum. The hydroxyl terminated P(S-r-MMA) random copolymer was synthesized as reported earlier. (P. Mansky, Y. Liu, E. Huang, T. P. Russell, C. Hawker, *Science* 1997, 275, 1458.) The annealed sample was washed with toluene to remove unreacted random copolymers. A block copolymer, 46 k-21 k, P(S-b-MMA) solution in toluene (1.5 wt %) was then spin-coated at 4,000 rpm onto the random copolymer-covered silicon oxide/silicon wafer substrate and annealed at 230° C. under vacuum for 3 hrs, resulting in the perpendicular PMMA cylindrical structure of the block copolymer thin film.

In order to release the three-layered film from the Si wafer and float the film on an air-water interface, a 20% HF aqueous solution was used to remove the silicon. The floated film on air-HF aqueous solution interface was transferred to deionized (DI) water where it was picked up by the surface of the graphene/Cu foil, and allowed to dry for one day.

The sample was then exposed to UV illumination (1000 $mJ/cm^2$) to selectively degrade the PMMA cylinders in the BCP layer of the film. PMMA residue of those samples was removed by dipping in acetic acid for 2 minutes and rinsed with DI water. $O_2$ plasma RIE (50 W, 10 mT, 10 sccm) was utilized to etch through the P(S-r-MMA), the silicon oxide, and the graphene, providing a layer of graphene patterned with an array of holes having atomically-disordered edges. After patterning, the remaining etch mask was removed with ultrasonication in NMP and washing with isopropanol.

Edge-Annealing:

The patterned layer of graphene was then annealed to alter the edge structures of the holes in the graphene. This was done by reloading the patterned graphene into the CVD chamber and heating the graphene to 850° C. under 50 sccm forming gas (95% argon, 5% hydrogen) and 0.068 sccm diluted methane (95% argon, 5% methane). The layer of graphene was annealed at that condition for 55 minute, then was rapidly cooled (10° C./sec) to 600° C. and, finally, cooled to room temperature.

Results

Figure 2:
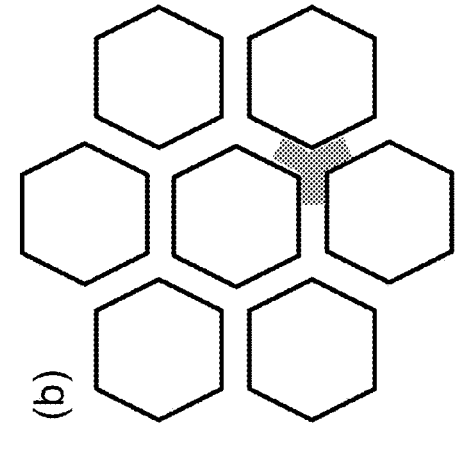
FIG. 2 shows schematic illustrations of: (a) a layer of graphene into which an array of circular holes with disordered edges has been lithographically patterned, and (b) the layer of graphene after the circular holes have been converted into hexagonal holes. The corresponding scanning electron micrograph (SEM) images are shown in panels (c) and (d).
Figure 2:
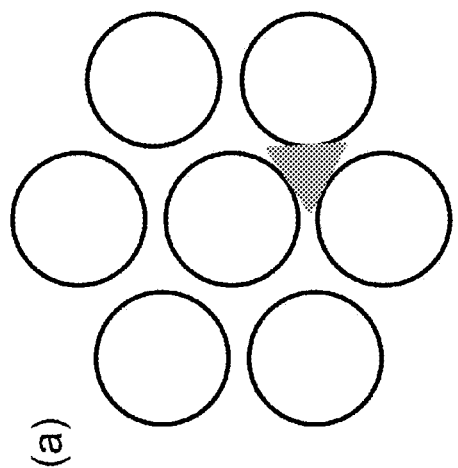
Figure 2:
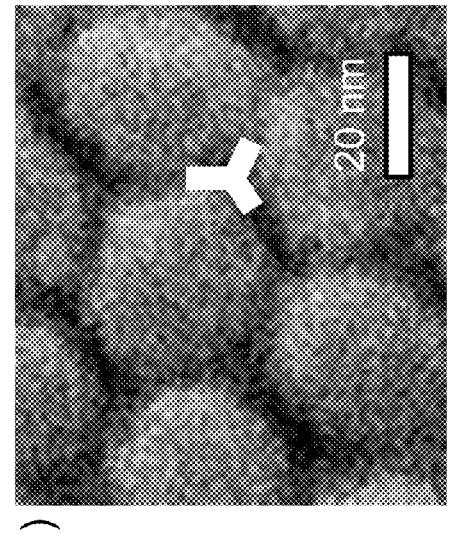
Figure 2:
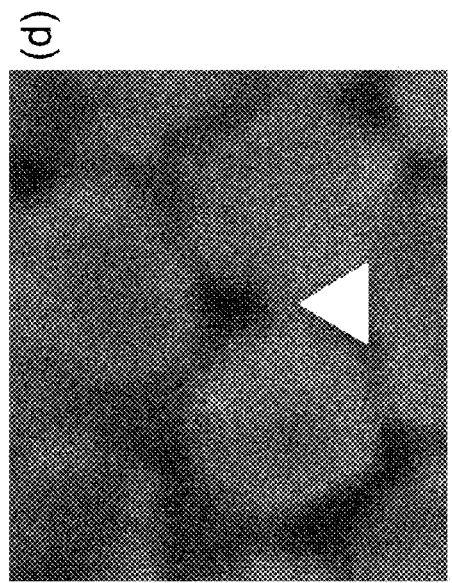

Scanning electron microscope (SEM) images of the patterned graphene prior to the edge anneal revealed that the holes appeared circular, separated by substantially triangle-shaped vertices where three holes are closest together. This geometry is represented schematically (panel (a)) and in the SEM image (panel (c)) of FIG. 2. After the edge anneal, however, SEM images (FIG. 2(*d*)) revealed that the holes were converted into hexagonal holes and the constriction widths (i.e., the widths of the graphene material between the holes) became smaller and uniform, changing the shape formed at the vertices of the holes, as shown in the schematic representation in FIG. 2(*b*). This indicates that the carbons along the internal edges of the holes have adopted a zigzag orientation, resulting in atomically-smooth holes.

In this example, the BCP etch mask had multiple hexagonal domains oriented randomly with respect to the lattice directions of the layer of graphene. When the relative BCP domain lattice directions were compared, it was observed that hexagon-shaped holes formed in those areas where the BCP and the graphene has the same lattice direction, while circular holes, having a lattice direction 30° off from the graphene lattice direction, formed consistently in those areas where the BCP and the graphene had different lattice directions. This indicated that when the BCP and graphene lattices are oriented in the same direction, zigzag edges are formed, creating hexagonal holes. However when the BCP and graphene lattices are oriented in different directions, some zigzag and some armchair edges are formed, creating circular holes.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. Patterned graphene on a substrate comprising the substrate and a layer of graphene on the substrate, the layer of graphene comprising a graphene antidot lattice comprising at least 1,000 holes defined in the layer of graphene, wherein the holes are hexagonal in shape and aligned with the hexagonal crystal symmetry of the graphene lattice, the graphene antidot lattice having an area of at least 1 µm$^2$ and a hole density of at least 1×10$^{11}$ holes/cm$^2$, and further wherein the holes have internal edges have a zigzag configuration.

2. The patterned graphene of claim 1, wherein the holes have diameters of 50 nm or less.

3. The patterned graphene of claim 1, wherein the holes have diameters of 10 nm or less.

4. The patterned graphene of claim 1 having an area of at least 1 mm$^2$.

5. A patterned graphene structure comprising a substrate and a graphene nanoribbon array comprising at least 1,000 graphene nanoribbons aligned in a parallel arrangement along their longitudinal axes on the substrate, wherein the nanoribbons have longitudinal edges that have a root mean square roughness no greater than 5 nm over a length of at least 50 nm and are aligned with the crystallographic direction of the graphene, further wherein the longitudinal edges of the nanoribbons have a zigzag configuration extending over a length of at least 50 nm, and wherein the nanoribbons have widths of no greater than 5 nm.

6. The patterned graphene of claim 5, wherein the graphene nanoribbons have a pitch of 500 nm or less and the graphene nanoribbon array covers an area of at least 1 µm$^2$.

7. The patterned graphene of claim 5 wherein the longitudinal edges of the nanoribbons have a root mean square roughness no greater than 3 nm and a zigzag configuration extending over a length of at least 50 nm.

8. The patterned graphene of claim 5, wherein the longitudinal edges of the nanoribbons have a root mean square roughness no greater than 1 nm and a zigzag configuration extending over a length of at least 50 nm.

9. The patterned graphene of claim 5, wherein the longitudinal edges of the nanoribbons have a root mean square roughness no greater than 3 nm and a zigzag configuration extending over a length of at least 100 nm.

10. The patterned graphene of claim 5, wherein the longitudinal edges of the nanoribbons have a root mean square roughness no greater than 3 nm and a zigzag configuration extending over a length of at least 1 µm.

11. The patterned graphene of claim 5, wherein the longitudinal edges of the nanoribbons have a root mean square roughness no greater than 1 nm and a zigzag configuration extending over a length of at least 100 nm.

12. The patterned graphene of claim 5, wherein the longitudinal edges of the nanoribbons have a root mean square roughness no greater than 1 nm and a zigzag configuration extending over a length of at least 1 µm.

13. The patterned graphene of claim 5, wherein the longitudinal edges of the nanoribbons have a root mean square roughness no greater than 1 nm and a zigzag configuration extending over a length of at least 100 µm.

* * * * *

UNITED STATES PATENT AND TRADEMARK OFFICE
CERTIFICATE OF CORRECTION

PATENT NO. : 10,252,914 B2
APPLICATION NO. : 15/184036
DATED : April 9, 2019
INVENTOR(S) : Michael Scott Arnold et al.

Page 1 of 1

It is certified that error appears in the above-identified patent and that said Letters Patent is hereby corrected as shown below:

In the Claims

Claim 1, Column 9, Line 19:
Delete the phrase "the holes have internal edges" and replace with --the holes having internal edges--.

Signed and Sealed this
Twenty-fifth Day of June, 2019

Andrei Iancu
*Director of the United States Patent and Trademark Office*